(12) United States Patent
Kang et al.

(10) Patent No.: US 9,019,910 B2
(45) Date of Patent: Apr. 28, 2015

(54) SYSTEM AND METHOD FOR MANAGING RESOURCE IN COMMUNICATION SYSTEM

(75) Inventors: Hyunduk Kang, Gwangju (KR); Dong-Hun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/339,697

(22) Filed: Dec. 29, 2011

(65) Prior Publication Data
US 2012/0201208 A1  Aug. 9, 2012

(30) Foreign Application Priority Data

Dec. 29, 2010 (KR) .......... 10-2010-0137984
Jun. 16, 2011 (KR) .......... 10-2011-0058732
Dec. 28, 2011 (KR) .......... 10-2011-0144407

(51) Int. Cl.
H04W 4/00 (2009.01)
H04W 16/14 (2009.01)
H04W 72/04 (2009.01)

(52) U.S. Cl.
CPC .......... *H04W 16/14* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,869,400 B2 | 1/2011 | Hu et al. | |
| 8,200,161 B2 | 6/2012 | Walley et al. | |
| 8,289,903 B2 | 10/2012 | Shan et al. | |
| 8,310,991 B2 | 11/2012 | Kasslin et al. | |
| 8,363,602 B2 | 1/2013 | Junell et al. | |
| 8,379,586 B2 | 2/2013 | Kasslin et al. | |
| 8,385,286 B2 | 2/2013 | Junell et al. | |
| 8,451,789 B2 | 5/2013 | Junell et al. | |
| 8,514,802 B2 | 8/2013 | Junell | |

(Continued)

FOREIGN PATENT DOCUMENTS

| | | |
|---|---|---|
| EP | 2 083 593 A2 | 7/2009 |
| KR | 1020060060452 A | 6/2006 |

(Continued)

OTHER PUBLICATIONS

Jihyun Lee, et al; "Coexistence Procedures and Protocols", IEEE 802.19 Wireless Coexistence Working Group, IEEE P802.19-11/0009r1; Date Submited: Jan. 17, 2011, 87 pages.

(Continued)

*Primary Examiner* — Kouroush Mohebbi
(74) *Attorney, Agent, or Firm* — Ladas & Parry LLP

(57) ABSTRACT

A system for managing resources in a communication system including a plurality of systems, which do not have a permission for a first frequency band, includes a plurality of coexistence managers configured to, when a frequency band available for the plurality of systems is searched from the first frequency band, manage the plurality of systems for coexistence and frequency sharing of the plurality of systems in the available frequency band; a coexistence enabler configured to transmit and receive information of the plurality of systems and information of the coexistence manager; and a coexistence discovery and information server configured to support control of the coexistence manager over the plurality of systems, wherein predetermined messages are transmitted and received among the coexistence discovery and information server, the plurality of coexistence managers and the coexistence enabler to discover neighbor systems among the plurality of systems.

20 Claims, 6 Drawing Sheets

(56) References Cited

U.S. PATENT DOCUMENTS

| | | |
|---|---|---|
| 8,615,250 B2 | 12/2013 | Xing |
| 2007/0223508 A1 | 9/2007 | Nandagopalan |
| 2008/0108366 A1 | 5/2008 | Hu |
| 2009/0059856 A1 | 3/2009 | Kermoal et al. |
| 2010/0061326 A1 | 3/2010 | Lee et al. |
| 2010/0124254 A1 | 5/2010 | Wu et al. |
| 2011/0032892 A1 | 2/2011 | Bahl et al. |
| 2011/0075586 A1 | 3/2011 | Hu et al. |
| 2011/0096770 A1 | 4/2011 | Henry |
| 2011/0116458 A1 | 5/2011 | Hsu et al. |
| 2011/0116484 A1 | 5/2011 | Henry |
| 2011/0164580 A1 | 7/2011 | Keon |
| 2011/0164581 A1 | 7/2011 | Keon |
| 2011/0250858 A1* | 10/2011 | Jain et al. ................ 455/120 |
| 2011/0286401 A1 | 11/2011 | Wijting et al. |
| 2011/0287802 A1 | 11/2011 | Ma et al. |
| 2012/0058790 A1* | 3/2012 | Junell et al. .............. 455/509 |
| 2012/0106364 A1 | 5/2012 | Kasslin et al. |
| 2012/0108179 A1 | 5/2012 | Kasslin et al. |
| 2012/0113906 A1 | 5/2012 | Kadous et al. |
| 2012/0115525 A1 | 5/2012 | Kang et al. |
| 2012/0117243 A1 | 5/2012 | Lee et al. |
| 2012/0195269 A1 | 8/2012 | Kang et al. |
| 2012/0195270 A1 | 8/2012 | Kang et al. |
| 2012/0201209 A1 | 8/2012 | Lee et al. |
| 2012/0314681 A1 | 12/2012 | Chen et al. |
| 2013/0051279 A1 | 2/2013 | Lee et al. |
| 2013/0155995 A1 | 6/2013 | Jo et al. |
| 2013/0155998 A1 | 6/2013 | Jo et al. |
| 2013/0157681 A1 | 6/2013 | Jo et al. |
| 2013/0157706 A1 | 6/2013 | Jo et al. |
| 2013/0165136 A1 | 6/2013 | Kang et al. |
| 2013/0165170 A1 | 6/2013 | Kang |

FOREIGN PATENT DOCUMENTS

| | | |
|---|---|---|
| KR | 1020070048171 A | 5/2007 |
| KR | 20100053643 A | 5/2010 |
| KR | 20110089262 A | 8/2011 |

OTHER PUBLICATIONS

Junyi Wang, et al; "Proposal for Chapter 6", IEEE 802.19 Wireless Coexistence Working Group; IEEE P802.19-11/71r1; Date Submited: Jul. 18, 2011; 51 pages.

USPTO NOA mailed Jan. 10, 2014 in connection with U.S. Appl. No. 13/339,727.

* cited by examiner

SYSTEM AND METHOD FOR MANAGING RESOURCE IN COMMUNICATION SYSTEM

CROSS-REFERENCES TO RELATED APPLICATIONS

The present application claims priority of Korean Patent Application Nos. 10-2010-0137984, 10-2011-0058732, and 10-2011-0144407, filed on Dec. 29, 2010, Jun. 16, 2011, and Dec. 28, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in the communication system.

2. Description of Related Art

In a current communication system, research for providing services of various qualities of service (hereinafter, referred to as 'QoSs') to users at a high transmission rate has been actively conducted. In such a communication system, research for providing large-capacity services having various QoSs using limited resources, for example, frequency resources, has been actively conducted. In particular, due to development of radio communication technologies and introduction of new wireless communication services, there is a need to efficiently use limited frequency resources.

As a method for increasing efficiency of using limited frequency resources in a communication system, there have been suggested methods for optimizing performance of the communication system, for example, methods for minimizing interference with other types of communication systems while maximizing spectral efficiency by using multiple access, encoding, modulation, information compression, etc. Also, there has been suggested a frequency sharing method for increasing frequency resource utilization efficiency by using a frequency band available from an already used frequency band such as a TV band.

Here, the frequency sharing of the frequency band available from the already used frequency band such as a TV band needs to use the available frequency band without providing interference to a primary incumbent having a preemptive permission for the TV band. Therefore, it is important to detect the available frequency band by confirming whether or not the primary incumbent uses the available frequency band in the TV band. Further, in the case where a plurality of different systems intending to use the available frequency band detected in the TV band exist, a problem is caused in terms of coexistence for using the available frequency band due to a difference in communication pattern, for example, in wireless access pattern, among the plurality of different systems.

In other words, in the current communication system, in the case where the plurality of different systems intending to use the available frequency band detected in the TV band exist as described above, a detailed method for managing resources for allowing the plurality of different systems to efficiently use the detected available frequency band is not provided. In particular, a method for efficiently using frequency resources through coexistence of the systems adopting different communication patterns so as to use the available frequency band is not provided.

Therefore, a need exists for a method for managing resources for efficiently using the detected available frequency band through coexistence of the plurality of different systems, for example, the different communication patterns of systems, after detecting the available frequency band from the already used frequency band such as a TV band in the communication system.

SUMMARY OF THE INVENTION

An embodiment of the present invention is directed to a system and a method for managing resources in a communication system.

Another embodiment of the present invention is directed to a system and a method for managing resources so as to efficiently use frequency bands among frequency bands used in advance in a communication system by coexistence of a plurality of systems.

Another embodiment of the present invention is directed to a system and a method for managing frequency resources so as to use available frequency bands in a TV band by coexistence of a plurality of systems in a communication system.

Another embodiment of the present invention is directed to a system and a method for managing frequency resources so as to use available frequency bands of a TV band by efficient coexistence and frequency sharing of a plurality of systems in the available frequency bands in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems, which do not have a permission for a first frequency band, includes: a coexistence manager configured to, when a frequency band available for the plurality of systems is searched from the first frequency band, manage the plurality of systems for coexistence and frequency sharing of the plurality of systems in the available frequency band; a coexistence enabler configured to transmit and receive information of the plurality of systems and information of the coexistence manager; and a coexistence discovery and information server configured to support control of the coexistence manager over the plurality of systems, wherein a plurality of coexistence managers are provided to respectively correspond to the plurality of systems, and wherein predetermined messages are transmitted and received among the coexistence discovery and information server, the plurality of coexistence managers and the coexistence enabler to discover neighbor systems among the plurality of systems.

In accordance with another embodiment of the present invention, a method for managing resources of a first frequency band in a communication system including a plurality of systems, which do not have a permission for the first frequency band, includes: subscribing a plurality of coexistence managers configured to, when a frequency band available for the plurality of systems is searched from the first frequency band, manage the plurality of systems for coexistence and frequency sharing of the plurality of systems in the available frequency band, to a coexistence discovery and information server configured to support control of the plurality of coexistence managers over the plurality of systems; discovering neighbor systems among the plurality of systems; and sharing coexistence information of discovered neighbor systems between the coexistence managers and the coexistence discovery and information server.

DESCRIPTION OF SPECIFIC EMBODIMENTS

Figure 1:
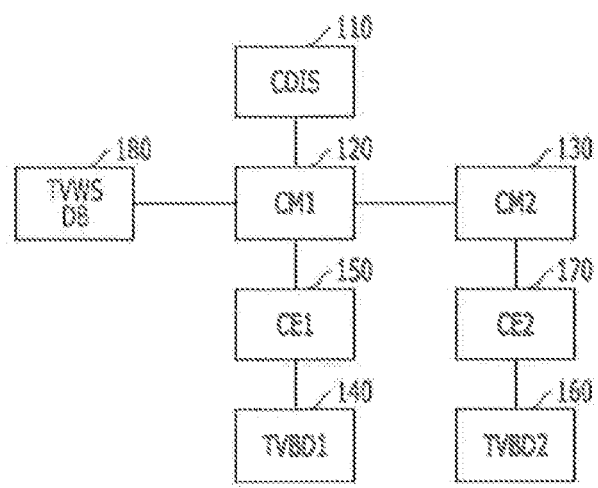
FIG. 1 is a diagram schematically showing a structure of a system for managing resources in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An Embodiment of the present invention proposes a system and a method for managing resources, capable of detecting an available frequency band, for example, an idle frequency band (a white space: hereinafter, referred to as a 'WS'), from an already used frequency band such as a TV band in a communication system, for example, a cognitive radio (hereinafter, referred to as 'CR') system, an IEEE 802.19-based system or an IEEE 802.22-based system, and of effectively using the detected available frequency band. Here, while the embodiment of the present invention is described by exemplifying the CR system and the IEEE 802.19-based and IEEE 802.22-based systems, it is to be noted that the method for managing resources proposed in the embodiment of the present invention may be applied to other communication systems.

Also, the embodiment of the present invention proposes a system and a method for managing resources so as to use a frequency band available from a TV band through coexistence of a plurality of different systems in a communication system. Here, the embodiment of the present invention provides coexistence of respective objects of the system for managing resources for providing the sharing of the available frequency band in the communication system and provides coexistence of a plurality of different systems, in particular, systems using different communication patterns, for example, different wireless access patterns, so as to share the available frequency band available from the already used frequency band such as a TV band, thereby improving frequency resource utilization efficiency.

That is, the embodiment of the present invention allows the system for managing resources for the coexistence and the frequency sharing among the plurality of different systems in the communication system to share the available frequency band, thereby improving the efficiency of using limited frequency resources. Here, the embodiment of the present invention shares a frequency in the available frequency band from the already used frequency band such as a TV band. In this regard, the embodiment of the present invention need to use the available frequency band without providing interference to a primary incumbent having a preemptive permission for the TV band. To this end, the embodiment of the present invention detects the available frequency band by confirming whether the primary incumbent uses the frequency band in the TV band, and selects and uses operating channels in the detected available frequency band through the coexistence and the frequency sharing of the plurality of difference systems intending to use the available frequency band detected from the TV band. In other words, in the embodiment of the present invention, the system for managing resources for the coexistence and the frequency sharing among the plurality of different systems in the communication systems allows predetermined objects to select the operating channels in the WS for efficient coexistence. In this case, the embodiment of the present invention classifies channels available in the WS for effective selection of the operating channels in the WS and allocates the classified channels.

Here, in order for efficient coexistence and frequency sharing among the plurality of different systems in the band available from the TV band, that is, in a TVWS, the system for managing resources performs message transmission and reception procedures. In other words, in order for efficient coexistence and frequency sharing of the plurality of different systems which use the TVWS, the system for managing resources transmits and receives messages among the respective objects of the system for managing resources. In particular, the system for managing resources transmits and receives messages regarding registration, coexistence information gathering, coexistence decision making, reconfiguration, management and an event, thereby improving efficiencies of the coexistence and frequency sharing of the plurality of different systems in the TVWS.

That is to say, in order for the efficient coexistence and frequency sharing of the plurality of different systems in the TVWS, in the system for managing resources according to the embodiment of the present invention, a registration procedure and a message in the registration procedure are defined, and a coexistence information gathering procedure and a message in the coexistence information gathering procedure are defined. Further, in the system for managing resources, a coexistence decision making procedure and a message in the coexistence decision making procedure are defined, a reconfiguration procedure and a message in the reconfiguration procedure are defined, a management procedure and a message in the management procedure are defined, and an event procedure and a message in the event procedure are defined. Namely, in order for the efficient coexistence and frequency sharing of the plurality of different systems in the TVWS, the messages defined in this way are transmitted and received among the respective objects of the system for managing resources, and the defined procedures are performed, thereby improving the efficiencies of the coexistence and frequency sharing of the plurality of different systems in the TVWS. Here, the system for managing resources in a communication system in accordance with the embodiments of the present invention will be described in more detail with reference to FIG. 1.

FIG. 1 is a diagram schematically illustrating a structure of a system for managing resources in a communication system in accordance with an embodiment of the present invention.

Referring to FIG. 1, when a plurality of different systems intend to use a frequency band available from an already used frequency band such as a TV band, that is, a TVWS, the system for managing resources includes sharing devices intending to use the available frequency band through frequency sharing among the plurality of different systems, for example, a TV band device 1 (hereinafter, referred to as 'TVBD1') 140 and a TVBD2 160, coexistence managers (hereinafter, referred to as 'CMs') managing the TVBDs 140 and 160 for improving frequency sharing efficiency between the TVBDs 140 and 160, for example, CM1 120 and a CM2 130, coexistence enablers (hereinafter, referred to as 'CEs') included in the TVBDs 140 and 160 or independently located to serve as passages between the TVBDs 140 and 160 and the CMs 120 and 130, for example, a CE1 150 and a CE2 170, a server supporting control of the TVBDs 140 and 160 by the CMs 120 and 130, for example, a coexistence discovery and information server (hereinafter, referred to as 'CDIS'), and a TVWS data base 180 (hereinafter, referred to as 'TVWS DB') providing channel information for the band available from the TV band, that is, the TVWS. Here, the system for managing resources includes the CEs, the CMs, the CDIS and the TVWS DB as objects for coexistence and frequency sharing of the plurality of systems, that is, the TVBDs, in the TVWS.

The TVBDs 140 and 160 mean devices of the plurality of different systems, that is, secondary systems, allowing other users (hereinafter, referred to as the 'secondary systems') who do not have a preemptive permission for the TV band, to detect and use a predetermined frequency band as the available frequency band from the TV band, when a primary incumbent (hereinafter, referred to as a 'primary system') having the preemptive permission for the TV band does not use the predetermined frequency band in the TV band as aforementioned above. Here, the TVBDs 140 and 160 share and use the predetermined frequency band through the coexistence and the frequency sharing so as to efficiently use limited frequency resources. That is, the TVBDs 140 and 160 are allocated with channels from the TVWS, and transmit and receive data.

The CEs 150 and 170 are independently located in the TVBDs 140 and 160 as described above, and transmit and receive the information of the TVBDs 140 and 160 and the information of the CMs 120 and 130. Here, while it is mainly described in the embodiment of the present invention for the sake of convenience in explanation that the CEs 150 and 170 independently exist in the TVBDs 140 and 160, it is to be noted that the CEs 150 and 170 may be included in the TVBDs 140 and 160 or the CMs 120 and 130.

In addition, the CEs 150 and 170 extract context information associated with the corresponding TVBDs 140 and 160, requested by the respective CMs 120 and 130, for example, information such as a wireless access pattern, transmission power, a spectral sensing threshold value, a position and so forth of the TVBDs 140 and 160, from the TVBDs 140 and 160, and transmit the extracted context information to the CMs 120 and 130. That is to say, the CEs 150 and 170 acquire the communication-related information of respective secondary systems as the context information on different secondary systems, and transmit the acquired information to the CMs 120 and 130.

Further, the CEs 150 and 170 receive requests from the CMs 120 and 130 for management of the TVBDs 140 and 160, for example, requests for the context information and the configurations of the TVBDs 140 and 160, and in response to the requests, update the context information of the TVBDs 140 and 160 and reset, that is, reconfigure the configurations of the TVBDs 140 and 160. In other words, the CEs 150 and 170 receive changed information of the context information, that is, event information of the TVBDs 140 and 160, as the requests for the context information of the TVBDs 140 and 160, and update the context information of the TVBDs 140 and 160 according to the event information. Moreover, the CEs 150 and 170 receive resetting of the components of the TVBDs 140 and 160 as the requests for the configurations of the TVBDs 140 and 160, and reset, that is, reconfigure the components of the TVBDs 140 and 160 according to the resetting of the components.

The CMs 120 and 130 determine operation frequency allocation, transmission power allocation, transmission time allocation, and so forth, so as to improve the frequency sharing efficiency between the TVBDs 140 and 160. In other words, the CMs 120 and 130 perform the operation frequency allocation, the transmission power allocation, and the transmission time allocation for the TVBDs 140 and 160 in the available frequency band so as to improve the frequency sharing efficiency between the TVBDs 140 and 160 for the available frequency band in the above-described TV band.

Here, the CMs 120 and 130 perform the operation frequency allocation, the transmission power allocation, and the transmission time allocation for the corresponding TVBDs in the available frequency band by transmitting and receiving information, for example, the context information and the event information of the TVBDs, to and from the CMs, for example, neighbor CMs, of the TVBDs that do not correspond to the CMs 120 and 130, so as to more improve the frequency sharing efficiency between the TVBDs 140 and 160. In this case, the CMs 120 and 130 acquire the context information and the event information of the TVBDs that do not correspond to the CMs 120 and 130, through direct transmission and reception to and from other CMs (for example, neighbor CMs) or transmission and reception via the CDIS 110 to and from other CMs. Further, the CMs 120 and 130 acquire information on the use of a spectrum in the primary system, that is, channel information on channels available in the TV band, through an external data base, for example, TVWS DB 180, or request resetting of the components the TVBDs corresponding to the CMs 120 and 130, to other CMs.

As described above, the CDIS 110 supports the control operation of the CMs 120 and 130 for frequency sharing of the TVBDs 140 and 160 for the available frequency band in the TV band. Namely, the CDIS 110 receives and stores the context information and the event information of the TVBDs 140 and 160 from the CMs 120 and 130, and transmits the context information and the event information of the TVBDs 140 and 160 to the CMs 120 and 130 according to requests from the CMs 120 and 130. Furthermore, the CDIS 110 acquires and stores the information on the use of a spectrum in the primary system, that is, the channel information on channels available in the TV band, through the external data base, for example, the TVWS DB 180.

The TVWS DB 180 provides channel information on channels available in the TVWS, that is, shared channel information, to the CMs 120 and 130. The channel information is provided only to the TVBDs that are registered in the TVWS DB 180 and have authorized identification numbers.

The system for managing resources in a communication system in accordance with the embodiment of the present invention includes the TVWS DB 180, the CDIS 110, the CMs 120 and 130, and the CEs 140 and 160, so as to allow the secondary systems to share and use the frequency band available from the frequency band already used by the primary system, such as the TV band, that is, so as to allow coexistence and frequency sharing of the TVBDs 140 and 160. Here, the TVBDs 140 and 160 as devices of the secondary systems for sharing and using the available frequency band as described above may include a base station (hereinafter, referred to as 'BS'), an access point (hereinafter, referred to as 'AP'), a service access point (hereinafter, referred to as 'SAP'), a terminal, or the like. Also, the secondary systems as the plurality of different systems for sharing the available frequency band as described above may include different communication patterns of systems, for example, an IEEE 802.19-based system, an IEEE 802.22-based system, or the like.

Besides, the system for managing resources in a communication system in accordance with the embodiment of the present invention transmits and receives predetermined messages so as to provide the coexistence and the frequency sharing of the TVBDs 140 and 160 for the frequency band available in the already used frequency band, in particular, so as to provide the efficient coexistence and frequency sharing of the plurality of systems, for example, the TVBDs 140 and 160, in the TVWS as described above, so that frequency utilization efficiency may be improved through the effective coexistence and frequency sharing of the plurality of systems in the TVWS.

The system for managing resources operates in a management mode and an autonomous mode (or an information mode). In the management mode, the system for managing resources reflects the frequency sharing devices indicated by the CMs, that is, the setting of the TVBDs and the resetting of the configurations of the TVBDs, on the TVBDs. In the autonomous mode, the system for managing resources makes by itself a decision on the coexistence and frequency sharing, on the basis of the information regarding the coexistence and frequency sharing, which is received by the CEs from the CMs. The decision made on the coexistence and frequency sharing is reflected on the TVBDs on which the setting of the TVBDs and the resetting of the configurations of the TVBDs are reflected. Also, the system for managing resources operates in a centralized topology and a distributed topology. In the centralized topology, among a plurality of CMs, a plurality of slave CMs are connected to one optional master CM. The slave CMs are controlled by the master CM for coexistence and frequency sharing among TVBDs. In the distributed topology, coexistence and frequency sharing among the TVBDs are implemented through negotiation between one optional CM and neighbor CMs of the one CM among a plurality of CMs.

The system for managing resources in a communication system in accordance with the embodiment of the present invention operates in the centralized topology or the distributed topology for the coexistence and frequency sharing of the TVBDs 140 and 160 for the frequency band available from the already used frequency band. At this time, the system for managing resources performs checking and discrimination for a neighbor frequency sharing device, that is, a predetermined TVBD, for example, the TVBD1 140, the CE1 and the CM1 and another neighbor frequency sharing device, for example, the TVBD2 160, the CE2 170 and the CM2 130. Here, in the system for managing resources, the checking and discriminating operations, that is, discovery operations, for the TVBD1 140, the CE1 150 and the CM1 120 and the neighbor TVBD2 160, the neighbor CE2 170 and the neighbor CM2 130 are performed by the CDIS 110, the CM1 120 and the CE1 150.

Moreover, in the discovery of the neighbor frequency sharing device with respect to the optional frequency sharing device, the system for managing resources performs discovery for neighbor TVDBs (not shown) registered in the same CM corresponding to the optional frequency sharing device, for example, the TVBD1 140, that is, the CM1 120, namely, for intra-CM neighbor TVBDs, and performs discovery for neighbor TVBDs registered in another CM not corresponding to the TVBD1 140, for example, the CM2 130, that is, inter-CM neighbor TVBDs, for example, the TVBD2 160. Here, the CM1 120 and the CM2 130 become neighbor CMs. In the case where the TVBDs registered in different CMs become neighbor TVBDs as described above, the neighbor CMs mean the CMs in which the neighbor TVBDs are registered. Since the CDIS 110, the CMs 120 and 130 and the CEs 150 and 170 of the system for managing resources perform the discovery operations for the neighbor frequency sharing devices as described above, discovery for the intra-CM neighbor TVBDs and the inter-CM neighbor TVBDs is performed in the discovery.

In detail, the system for managing resources in a communication system in accordance with the embodiment of the present invention, in particular, the CMs 120 and 130 and the CDIS 110 of the system for managing resources perform discovery for the neighbor frequency sharing devices, that is, the intra-CM neighbor TVBDs and the inter-CM neighbor TVBDs, and at this time, neighbor discovery of the CMs 120 and 130 and the CDIS 110 is performed. Further, for the neighbor discovery, the CMs 120 and 130 and the CDIS 110 perform the neighbor discovery through a neighbor discovery subscription to the CMs 120 and 130 and the CDIS 110, and discover the intra-CM neighbor TVBDs and the inter-CM neighbor TVBDs.

Here, the system for managing resources performs the neighbor discovery through a scheme (hereinafter, referred to as a 'first scheme') in which the CMs 120 and 130 perform discovery for the intra-CM neighbor TVBDs and the CDIS 110 performs discovery for the inter-CM neighbor TVBDs and a scheme (hereinafter, referred to as a 'second scheme') in which the CMs 120 and 130 do not perform by themselves discovery for neighbor TVBDs and the CDIS 110 performs both discovery for the intra-CM neighbor TVBDs and discovery for the inter-CM neighbor TVBDs. At this time, the neighbor discovery subscription is updated by the CMs 120 and 130, and the system for managing resources performs the neighbor discovery using one of the first scheme and the second scheme according to the update result of the neighbor discovery subscription.

In the case where the system for managing resources performs the neighbor discovery through the first scheme, the TVBDs of the system for managing resources are registered in the CMs through the CEs corresponding to them, and announce information of themselves, that is, information on the IDs, kinds and wireless access patterns of the TVBDs, to the CMs in which they are registered. Also, the CMs announce information on the IDs, kinds and wireless access patterns of the TVBDs registered in themselves, to other CMs, for example, neighbor CMs. That is to say, the respective CMs of the system for managing resources announce information of all the TVBDs registered in themselves, that is, information on the IDs, kinds and wireless access patterns of the TVBDs, to other CMs, and receive information on the IDs, kinds and wireless access patterns of the TVBDs registered in other CMs, for example, neighbor CMs.

An optional CM, which has received from other CMs the information of the TVBDs registered in other CMs in this way, discovers the TVBDs registered in itself and the neighbor TVBDs using the received information of the TVBDs, and verifies the information of the neighbor TVBDs, that is, the information on the IDs, kinds and wireless access patterns of the neighbor TVBDs. In the case where a new TVBD is registered in itself or a change occurs in an already registered TVBD, the optional CM updates the discovery of the neighbor TVBDs with respect to the TVBDs registered therein, and announces its information to the CDIS so as to check whether to update discovery for neighbor TVBDs between different CMs. In other words, since information of the optional CM on its TVBDs is needed to allow other CMs to discover neighbor TVBDs, after the optional CM is registered in the CDIS, the optional CM announces the information of the TVBDs belonging to the optional CM itself, that is, information on the ID of the optional CM and the IDs, kinds and wireless access patterns of the TVBDs registered in the optional CM, to the CDIS.

Based on the information received from the CMs, that is, the information on the IDs, kinds and wireless access patterns of the TVBDs registered in the CMs, the CDIS discovers neighbor TVBDs among the TVBDs of the CMs registered in itself, and verifies the information on the neighbor TVBDs, for example, the information on the ID of the neighbor CM in which the neighbor TVBDs are registered and the IDs, kinds and the wireless access patterns of the neighbor TVBDs. At this time, as described above, in the case where a new TVBD is registered in the CM or a change occurs in an already registered TVBD, the CDIS updates the discovery of the neighbor TVBDs, using the information on the ID of the CM and the IDs, kinds and wireless access patterns of the TVBDs registered in the CM, as the information received from the CM, that is, the information on the TVBDs belonging to the CM, and transmits the discovery information for the updated neighbor TVBDs to corresponding CMs.

Further, in the case where the system for managing resources performs the neighbor discovery through the second scheme, the TVBDs of the system for managing resources are registered in the CMs through the CEs corresponding to them, and announce information of themselves, that is, information on the IDs, kinds and wireless access patterns of the TVBDs, to the CMs in which they are registered, for discovery of the neighbor TVBDs. Also, after the CMs are registered in the CDIS, the CMs announce information necessary for discovery of the neighbor TVBDs, that is, information on the IDs of the CMs and the IDs, kinds and wireless access patterns of the TVBDs registered in themselves, to the CDIS.

That is to say, the respective CMs of the system for managing resources announce information of all the TVBDs registered in themselves, that is, the information on the IDs, kinds and wireless access patterns of the TVBDs, to the CDIS. Here, in the case where a new TVBD is registered or a change occurs in an already registered TVBD, the CMS announce their information to the CDIS so as to check whether to update discovery for neighbor TVBDs. In other words, the CMs announce the information on their IDs and the IDs, kinds and wireless access patterns of the TVBDs registered in the CMs, to the CDIS.

Based on the information received from the CMs, that is, the information on the IDs of the CMs and the IDs, kinds and wireless access patterns of the TVBDs registered in the CMs, the CDIS discovers neighbor TVBDs among the TVBDs of the CMs registered in itself, and verifies the information on the neighbor TVBDs, for example, the information on the IDs of the neighbor CMs in which the neighbor TVBDs are registered and the IDs, kinds and the wireless access patterns of the neighbor TVBDs. At this time, as described above, in the case where a new TVBD is registered or a change occurs in an already registered TVBD, the CDIS updates the discovery of the neighbor TVBDs, using the information on the IDs of the CMs and the IDs, kinds and wireless access patterns of the TVBDs registered in the CMs, as the information received from the CMs, that is, the information on the TVBDs belonging to the CMs, and transmits the discovery information for the updated neighbor TVBDs to corresponding CMs. Hereafter, a subscription in the discovery by the system for managing resources in a communication system in accordance with the embodiment of the present invention will be described in detail with reference to FIGS. 2 and 3.

Figure 2:
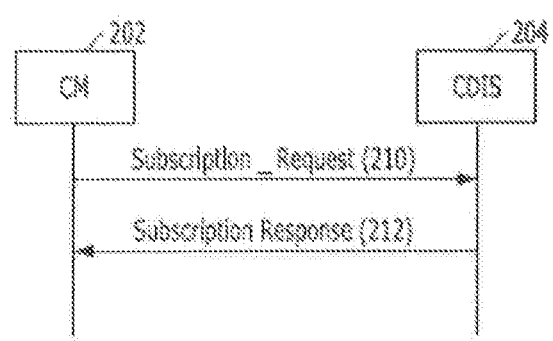
FIG. 2 is a diagram schematically showing a subscription procedure of the system for managing resources in a communication system in accordance with the exemplary embodiment of the present invention.

FIG. 2 is a diagram schematically showing a subscription procedure of the system for managing resources in a communication system in accordance with the exemplary embodiment of the present invention. Here, FIG. 2 is a diagram schematically showing a subscription procedure by a CM in the discovery of the system for managing resources in a communication system in accordance with the exemplary embodiment of the present invention.

Referring to FIG. 2, in order for neighbor discovery for coexistence and frequency sharing in a TVWS, a CM 202 should make a subscription to a CDIS 204. For making the subscription to the CDIS 204, the CM 202 transmits a subscription request (hereinafter, referred to as Subscription_Request) message to the CDIS 204 (step 210). Here, the contents of the Subscription_Request message, that is, the header and payload of the Subscription_Request message may be presented as in Table 1, and the data type of the Subscription_Request message may be presented as in Table 2.

TABLE 1

| Information element | Data type | Description |
| --- | --- | --- |
| Header | | |
| sourceIdentifier = CM_ID | CX_ID | Source identifier |
| destinationIdentifier = CM_ID or CDIS_ID | CX_ID | Destination identifier |
| ACKPolicy | BOOLEAN | Request to send an acknowledgement of reception |
| Payload | | |
| subscribedService | SubscribedService | Subscribed coexistence service |

TABLE 2

SubscribedService::= ENUMERATED{
    information,
    management,
    interCMNeighbors,
    allNeighbors
}

Further, the CM 202 receives a subscription response (hereinafter, referred to as Subscription_Response) message from the CDIS 204 as a response to the Subscription_Request message (step 212). Here, the contents of the Subscription_Response message, that is, the header and payload of the Subscription_Response message may be presented as in Table 3.

TABLE 3

| Information element | Data type | Description |
| --- | --- | --- |
| Header | | |
| sourceIdentifier = CDIS_ID | CX_ID | Source identifier |
| destinationIdentifier = CE_ID or CM_ID | CX_ID | Destination identifier |
| ACK Policy | BOOLEAN | Request to send an acknowledgement of reception |
| Payload | | |
| Status | BOOLEAN | Status: successful or not |

Figure 3:
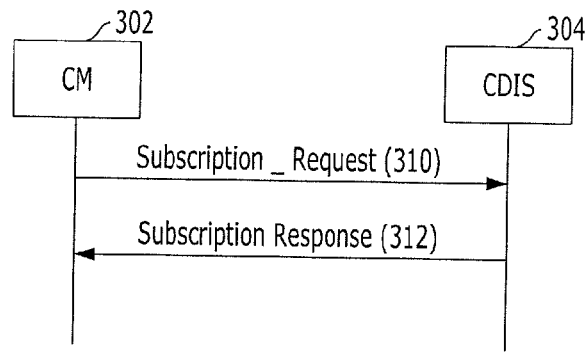
FIG. 3 is a diagram schematically showing a subscription update procedure of the system for managing resources in a communication system in accordance with the exemplary embodiment of the present invention.

FIG. 3 is a diagram schematically showing a subscription update procedure of the system for managing resources in a communication system in accordance with the exemplary embodiment of the present invention. Here, FIG. 3 is a diagram schematically showing a subscription update procedure by a CM in the discovery of the system for managing resources in a communication system in accordance with the exemplary embodiment of the present invention.

Referring to FIG. 3, after the subscription in the discovery described above with reference to FIG. 2, in order for update of the subscription, a CM 302 transmits a Subscription_Request message to a CDIS 304 (step 310). Here, the contents of the Subscription_Response message, that is, the header and payload of the Subscription_Response message may be presented as in Table 3, and the data type of the Subscription_Request message may be presented as in Table 2.

Further, the CM 302 receives a Subscription_Response message from the CDIS 304 as a response to the Subscription_Request message (step 312). Here, the contents of the Subscription_Response message, that is, the header and payload of the Subscription_Response message may be presented as in Table 3. Hereinbelow, the discovery operation of the system for managing resources in a communication system in accordance with the exemplary embodiment of the present invention will be described in detail with reference to FIGS. 4 to 11.

Figure 4:
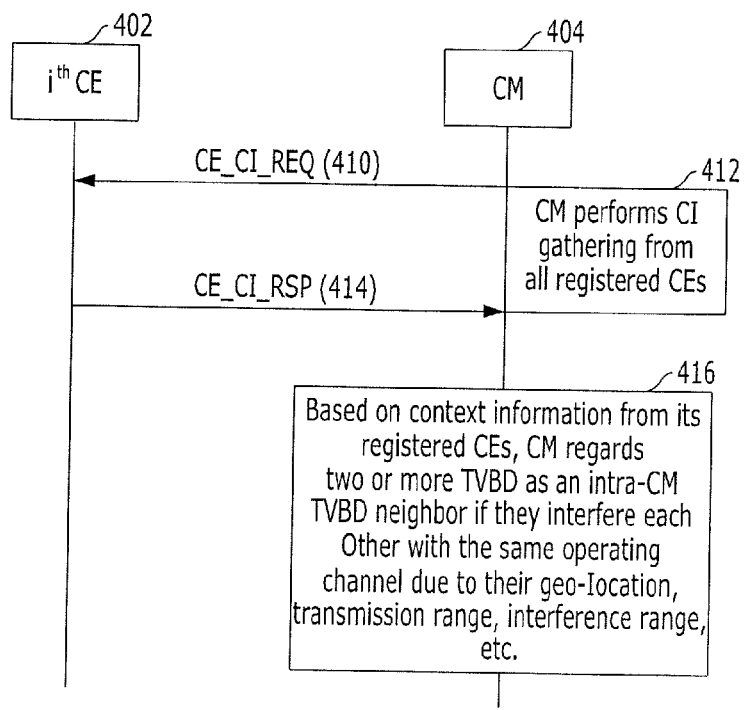
FIGS. 4 to 9 are diagrams schematically showing a neighbor discovery procedure of the system for managing resources in a communication system in accordance with the exemplary embodiment of the present invention.

FIG. 4 is a diagram schematically showing a neighbor discovery procedure of the system for managing resources in a communication system in accordance with the exemplary embodiment of the present invention. Here, FIG. 4 is a diagram schematically showing a neighbor discovery procedure for TVBDs registered in the same CM, that is, a procedure for discovering intra-CM neighbor TVBDs, in the system for managing resources in a communication system in accordance with the exemplary embodiment of the present invention.

Referring to FIG. 4, after the subscription for neighbor discovery for the coexistence and frequency sharing in the TVWS, in order to discover the intra-CM neighbor TVBDs, a CM 404 transmits a CE coexistence information request (hereinafter, referred to as 'CE_CI_REQ') message which requests information on TVBDs requiring to be registered in the CM 404 itself through an optional $i^{th}$ CE 402, that is, CE coexistence information, to the CE 402 (step 410).

Here, the CE_CI_REQ message is a message which requests the coexistence information of the TVBDs to be registered in the CM 404 through the CE 402, so as to discover the intra-CM neighbor TVBDs. Also, the CE_CI_REQ message is used in the same manner in the centralized topology, the distributed topology and the autonomous mode of the system for managing resources. Further, the CE_CI_REQ message is used in the case where the CM 404 requests the coexistence information of a CE, that is, the coexistence information of the TVBDs to be registered in a CM through the CE 402, to the CE 402. The contents of the CE_CI_REQ message, that is, the header and payload of the CE_CI_REQ message may be presented as in Table 4.

TABLE 4

| Name | Data Type | Description |
| --- | --- | --- |
| Header | | |
| SourceID | CM ID | Source identifier |
| DestinationID | CE ID | Destination identifier |
| Payload | | |
| TVBDInformationIDs | COEX_TVBD_INFO_IDS | TVBD information IDs<br>TVBD type<br>TVBD network type<br>TVBD antenna maximum gain<br>TVBD antenna height<br>TVBD geolocation<br>TVBD service duty cycle<br>TVBD service bandwidth<br>TVBD service coverage<br>TVBD interference range<br>TVBD operating channel list<br>TVBD channelization list<br>TVBD TVWS DB channel list<br>TVBD reconfigurable<br>TVWS channel list |

Moreover, the CM 404 transmits the CE_CI_REQ message to all CEs which are registered in the CM 404, and gathers the coexistence information of the CEs, that is, the coexistence information on all TVBDs (step 412). In addition, the CM 404 receives a CE coexistence information response (hereinafter, referred to as 'CE_CI_RSP') which includes the coexistence information of the TVBDs, for example, the context information of the TVBDs, from the CE 402 as a response to the CE_CI_REQ message (step 414).

Here, the CE_CI_RSP message as a response message for the CE_CI_REQ message, which requests the coexistence information of the TVBDs, is a message which is provided by the CE 402 to the CM 404 as the coexistence information of the TVBDs, that is, the information of the TVBDs to be registered in the CM 404, so as to discover the intra-CM neighbor TVBDs for the coexistence and frequency sharing of the TVBDs in the TVWS. Further, the CE_CI_RSP message is used in the same manner in the centralized topology, the distributed topology and the autonomous mode of the system for managing resources. The contents of the CE_CI_RSP message, that is, the header and payload of the CE_CI_RSP message may be presented as in Table 5.

TABLE 5

| Name | Data Type | Description |
| --- | --- | --- |
| Header | | |
| SourceID | CE ID | Source identifier |
| DestinationID | CM ID | Destination identifier |
| Payload | | |
| RegisteredCEID | STRING | Registered CE ID |
| RegisteredCETVBDType | COEX_TVBD_TYPE | TVBD type, categorized by Fixed device type Personal/portable mode I type Personal/portable mode II type |
| RegisteredCENetworkType | COEX_TVBD_NET_TYPE | TVBD network type such as IEEE 802.11af, IEEE 802.22 and IEEE 802.16, etc. |
| RegisteredCEAntennaMaxGain | REAL | TVBD antenna maximum gain |
| RegisteredCEAntennaHeight | REAL | TVBD antenna height |
| RegisteredCEGeolocation | COEX_TVBD_GEOLOCATION | TVBD geolocation, including Latitude Longitude Altitude |
| RegisteredCEDutycycle | REAL | TVBD service duty cycle |
| RegisteredCEBandwidth | REAL | TVBD service bandwidth |
| RegisteredCECoverage | REAL | TVBD service coverage |
| RegisteredCEInterferenceRange | REAL | TVBD interference range |
| RegisteredCEOperatingChList | SEQUENCE OF INTEGER | TVBD operating channel list |
| RegisteredCEChannelizationList | SEQUENCE OF REAL | TVBD channelization list |
| RegisteredCETVWSDBChList | COEX_TVBD_TVWS | TVBD TVWS DB channel list, including Allowed TVWS channel list Channel use constraint |

Further, the CM 404 discovers the intra-CM neighbor TVBDs, for example, the interference among the intra-CM neighbor TVBDs in the same operating channel due to the geolocations, transmission ranges, interference ranges, etc. of the intra-CM neighbor TVBDs, based on the coexistence information included in the CE_CI_RSP message, that is, based on the coexistence information of the CEs and TVBDs registered in the CM 404 (step 416). Hereinbelow, discovery of the inter-CM neighbor TVBDs of the system for managing resources in a communication system in accordance with the exemplary embodiment of the present invention will be described in detail with reference to FIG. 5.

Figure 5:
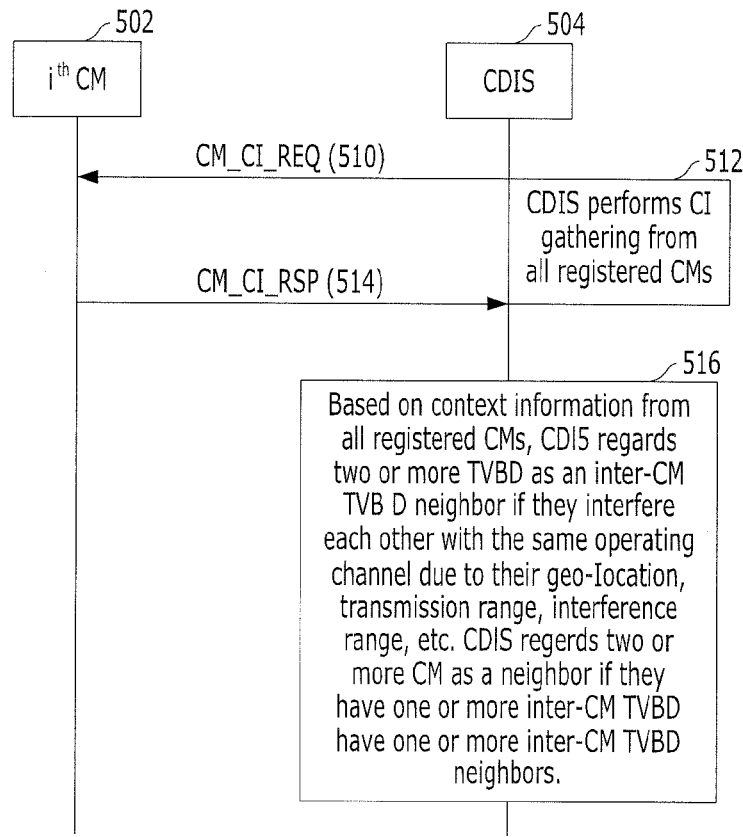

FIG. 5 is a diagram schematically showing a neighbor discovery procedure of the system for managing resources in a communication system in accordance with the exemplary embodiment of the present invention. Here, FIG. 5 is a diagram schematically showing a neighbor discovery procedure for TVBDs registered in different CMs, that is, a procedure for discovering inter-CM neighbor TVBDs, in the system for managing resources in a communication system in accordance with the exemplary embodiment of the present invention.

Referring to FIG. 5, after the subscription for neighbor discovery for the coexistence and frequency sharing in the TVWS, in order to discover the inter-CM neighbor TVBDs, a CDIS 504 transmits a CM coexistence information request (hereinafter, referred to as 'CM_CI_REQ') message which requests information on TVBDs registered in an optional i$^{th}$ CM 502, that is, CM coexistence information, to the CM 502 (step 510).

Here, the CM_CI_REQ message is a message which requests the coexistence information of the TVBDs registered in the CM 502, so as to discover the inter-CM neighbor TVBDs. Also, the CM_CI_REQ message is used in the same manner in the centralized topology, the distributed topology and the autonomous mode of the system for managing resources. Further, the CM_CI_REQ message is used in the case where the CDIS 504 requests the coexistence information of a corresponding CM to the CM 502 as described above and in the case where a CE requests the coexistence information of the TVBDs registered in the CM, to the CM. The contents of the CM_CI_REQ message, that is, the header and payload of the CM_CI_REQ message may be presented as in Table 6.

TABLE 6

| Name | Data Type | Description |
|---|---|---|
| Header | | |
| SourceID | CDIS ID/CE ID | Source identifier |
| DestinationID | CM ID | Destination identifier |
| Payload | | |
| RegisteredCMInformationIDs | COEX_CM_INFO_IDS | Registered CM information IDs Registered CE ID list Registered CE information TVBD type Network type Antenna maximum gain Antenna height Geolocation Service duty cycle Service bandwidth Service coverage Interference range Operating channel list Channelization list TVWS DB channel list Reconfigurable TVWS channel list |

Moreover, the CDIS 504 transmits the CM_CI_REQ message to all CMs which are registered in the CDIS 504, and gathers the coexistence information of the CMs, that is, the coexistence information on the TVBDs registered in all CMs (step 512). In addition, the CDIS 504 receives a CM coexistence information response (hereinafter, referred to as 'CM_CI_RSP') message which includes the coexistence information of the TVBDs registered in the CM 502, for example, the context information of the TVBDs, from the CM 502 as a response to the CM_CI_REQ message (step 514).

Here, the CM_CI_RSP message as a response message for the CM_CI_REQ message, which requests the coexistence information of the TVBDs registered in the CM 502, is a message which is provided by the CM 502 to the CDIS 504 as the coexistence information of the TVBDs, that is, the information of the TVBDs registered in the CM 502, so as to discover the inter-CM neighbor TVBDs for the coexistence and frequency sharing of the TVBDs in the TVWS. Further, the CM_CI_RSP message is used in the same manner in the centralized topology, the distributed topology and the autonomous mode of the system for managing resources. Further, the CM_CI_RSP message is used in the case where the CM 502 provides the coexistence information of the corresponding CM, that is, the coexistence information of the TVBDs registered in the corresponding CM, to the CDIS 504 as described above and in the case where the CM provides the coexistence information, that is, the coexistence information of the registered TVBDs, to a CE. The contents of the CM_CI_RSP message, that is, the header and payload of the CM_CI_RSP message may be presented as in Table 7.

TABLE 7

| Name | Data Type | Description |
|---|---|---|
| Header | | |
| SourceID | CE ID | Source identifier |
| DestinationID | CM ID | Destination identifier |
| Payload | | |
| RegisteredCEID | STRING | Registered CE ID |
| RegisteredCETVBDType | COEX_TVBD_TYPE | TVBD type, categorized by Fixed device type Personal/portable mode I type Personal/portable mode II type |
| RegisteredCENetworkType | COEX_TVBD_NET_TYPE | TVBD network type such as IEEE 802.11af, IEEE 802.22 and IEEE 802.16, etc. |
| RegisteredCEAntennaMaxGain | REAL | TVBD antenna maximum gain |

TABLE 7-continued

| Name | Data Type | Description |
|---|---|---|
| RegisteredCEAntennaHeight | REAL | TVBD antenna height |
| RegisteredCEGeolocation | COEX_TVBD_GEOLOCATION | TVBD geolocation, including Latitude Longitude Altitude |
| RegisteredCEDutycycle | REAL | TVBD service duty cycle |
| RegisteredCEBandwidth | REAL | TVBD service bandwidth |
| RegisteredCECoverage | REAL | TVBD service coverage |
| RegisteredCEInterferenceRange | REAL | TVBD interference range |
| RegisteredCEOperatingChList | SEQUENCE OF INTEGER | TVBD operating channel list |
| RegisteredCEChannelizationList | SEQUENCE OF REAL | TVBD channelization list |
| RegisteredCETVWSDBChList | COEX_TVBD_TVWS | TVBD TVWS DB channel list, including Allowed TVWS channel list Channel use constraint |

Further, the CDIS 504 discovers the inter-CM neighbor TVBDs, for example, the interference among the inter-CM neighbor TVBDs in the same operating channel due to the geolocations, transmission ranges, interference ranges, etc. of the inter-CM neighbor TVBDs, based on the coexistence information included in the CM_CI_RSP message, that is, based on the coexistence information of the CMs registered in the CDIS 504 (step 516). Hereafter, a neighbor discovery operation by a CM in the discovery by the system for managing resources in a communication system in accordance with the embodiment of the present invention will be described in detail with reference to FIGS. 6 and 7.

Figure 6:
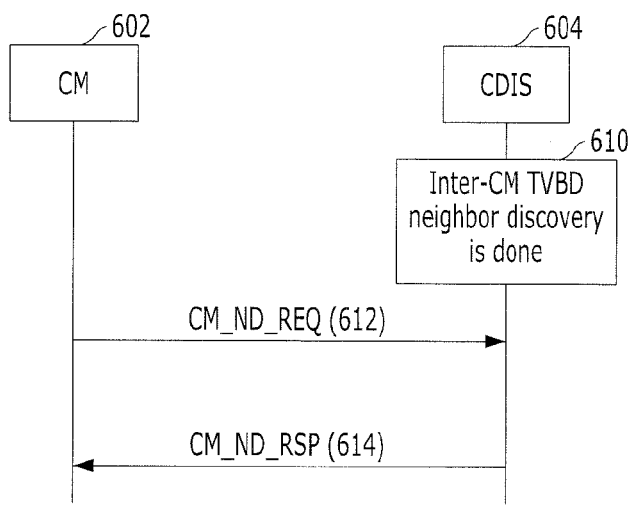
Figure 7:
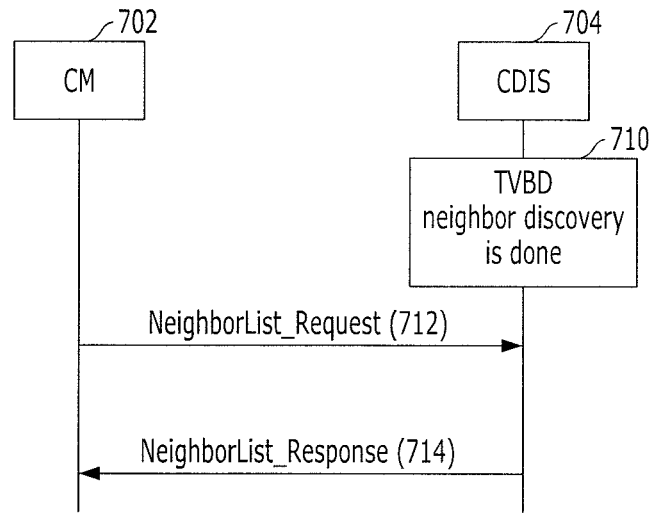

FIGS. 6 and 7 are diagrams schematically showing a neighbor discovery procedure of the system for managing resources in a communication system in accordance with the exemplary embodiment of the present invention. Here, FIGS. 6 and 7 are diagrams schematically showing a neighbor discovery procedure by a CM of the system for managing resources.

First, referring to FIG. 6, after the subscription for neighbor discovery for the coexistence and frequency sharing in the TVWS, in order for neighbor discovery, a CDIS 604 performs neighbor discovery among the TVBDs registered in different CMs, that is, neighbor discovery for the inter-CM neighbor TVBDs (step 610). Then, with the neighbor discovery for the inter-CM neighbor TVBDs performed, the CDIS 604 receives a CM neighbor discovery request (hereinafter, referred to as 'CM_ND_REQ') message for discovering the TVBDs registered in a CM 602 and neighbor CMs, that is, the inter-CM neighbor TVBDs, from the CM 602 (step 612). That is to say, in order to acquire the information of the inter-CM neighbor TVBDs and perform the neighbor discovery, the CM 602 transmits the CM_ND_REQ message to the CDIS 604 which has performed the neighbor discovery for the inter-CM neighbor TVBDs (step 612).

Here, the CM_ND_REQ message is a message which requests the coexistence information of the TVBDs registered in the neighbor CMs, so as to discover the inter-CM neighbor TVBDs as described above. Also, the CM_ND_REQ message is used in the same manner in the centralized topology, the distributed topology and the autonomous mode of the system for managing resources. Further, the CM_ND_REQ message is used in the case where the CM 602 requests the neighbor discovery information for the inter-CM neighbor TVBDs of the corresponding CM, to the CDIS 604. The contents of the CM_ND_REQ message, that is, the header and payload of the CM_ND_REQ message may be presented as in Table 8.

TABLE 8

| Name | Data Type | Description |
|---|---|---|
| Header | | |
| SourceID | CM ID | Source identifier |
| DestinationID | CDIS ID | Destination identifier |
| Payload | | |
| RegisteredCEIDList | SEQUENCE OF STRING | Registered CE ID list |

In addition, the CM 602 receives a CM neighbor discovery response (hereinafter, referred to as 'CM_ND_RSP') message which includes the neighbor discovery information for the inter-CM neighbor TVBDs, from the CDIS 604 as a response to the CM_ND_REQ message (step 614).

Here, the CM_ND_RSP message is a message which provides the coexistence information of the TVBDs registered in the neighbor CMs to discover the inter-CM neighbor TVBDs as described above. Further, the CM_ND_RSP message is used in the same manner in the centralized topology, the distributed topology and the autonomous mode of the system for managing resources. Further, the CM_ND_RSP message is used in the case where the CDIS 604 provides the neighbor discovery information for the inter-CM neighbor TVBDs of the corresponding CM, to the CM 602. The contents of the CM_ND_RSP message, that is, the header and payload of the CM_ND_RSP message may be presented as in Table 9.

TABLE 9

| Name | Data Type | Description |
|---|---|---|
| Header | | |
| SourceID | CDIS ID | Source identifier |
| DestinationID | CM ID | Destination identifier |
| Payload | | |
| CMFunction | BOOLEAN | To command a function of corresponding CM for the centralized topology Master CM Slave CM |

TABLE 9-continued

| | | |
|---|---|---|
| RegisteredCEIDList | SEQUENCE OF STRING | Registered CE ID list |
| The message contents below are repeated for each registered CE | | |
| RegisteredCEID | STRING | Registered CE ID |
| NeighborCMIDList | SEQUENCE OF STRING | Neighbor CM ID list |
| The message contents below are repeated for each neighbor CM | | |
| NeighborCMID | STRING | Neighbor CM ID |
| NeighborCEIDList | SEQUENCE OF STRING | Neighbor CE ID list |

Next, referring to FIG. 7, after the subscription for neighbor discovery for the coexistence and frequency sharing in the TVWS, in order for neighbor discovery, a CDIS 704 performs neighbor discovery for TVBDs, that is, neighbor discovery for inter-CM neighbor TVBDs and intra-CM neighbor TVBDs (step 710). Then, with the neighbor discovery for the inter-CM neighbor TVBDs and the intra-CM neighbor TVBDs performed, the CDIS 704 receives a neighbor list request (hereinafter, referred to as 'NeighborList_Request') message for discovering the TVBDs corresponding to a CM 702, that is, the inter-CM neighbor TVBDs and the intra-CM neighbor TVBDs, from the CM 702 (step 712). That is to say, in order to acquire the information of the inter-CM neighbor TVBDs and the intra-CM neighbor TVBDs and perform the neighbor discovery, the CM 702 transmits the NeighborList_Request message to the CDIS 704 which has performed the neighbor discovery for the inter-CM neighbor TVBDs and the intra-CM neighbor TVBDs (step 712).

Here, the NeighborList_Request message is a message which requests the coexistence information of the TVBDs, so as to discover the inter-CM neighbor TVBDs and the intra-CM neighbor TVBDs as described above. In other words, the NeighborList_Request message is used in the case where the CM 702 requests the neighbor discovery information for the inter-CM neighbor TVBDs and the intra-CM neighbor TVBDs of the corresponding CM, that is, the list information of the neighbor TVBDs, to the CDIS 704. The contents of the NeighborList_Request message, that is, the header and payload of the NeighborList_Request message may be presented as in Table 10. The data type of the NeighborList_Request message may be presented as in Table 11.

TABLE 10

| Information element | Data type | Description |
|---|---|---|
| Header | | |
| sourceIdentifier = CM_ID | CX_ID | Source identifier |
| destinationIdentifier = CDIS_ID | CX_ID | Destination identifier |
| ACKPolicy | BOOLEAN | Request to send an acknowledgement of reception |
| Payload | | |
| listOfCEID | SEQUENCE OF CX_ID OPTIONAL | CE ID list |

TABLE 11

```
CX_ID ::= ENUMERATED{
    CE_ID,
    CM_ID,
    CDIS_ID,
    TVWSDB_ID
}
```

In addition, the CM 702 receives a neighbor list response (hereinafter, referred to as 'NeighborList_Response') message which includes the neighbor discovery information for the inter-CM neighbor TVBDs and the intra-CM neighbor TVBDs, that is, the list information of the neighbor TVBDs, from the CDIS 704 as a response to the NeighborList_Request message (step 714).

Here, the NeighborList_Response message is a message which provides the coexistence information of the neighbor TVBDs to discover the inter-CM neighbor TVBDs and the intra-CM neighbor TVBDs as described above. Namely, the NeighborList_Response message is used in the case where the CDIS 704 provides the neighbor discovery information for the inter-CM neighbor TVBDs and the intra-CM neighbor TVBDs of the corresponding CM, that is, the list information of the neighbor TVBDs, to the CM 702. The contents of the NeighborList_Response message, that is, the header and payload of the NeighborList_Response message may be presented as in Table 12. The data type of the NeighborList_Response message may be presented as in Table 13.

TABLE 12

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Request to send an acknowledgement of reception |
| Payload | | |
| Note: Information elements below are repeated for each TVBD network or device. | | |
| CEID | CX_ID | CE ID |
| Note: Information elements below are repeated for each neighbor CM | | |
| neighborCMID | CX_ID | Neighbor CM ID |
| Note: Information elements below are repeated for each neighbour TVBD network or device. | | |

TABLE 12-continued

| networkID | NetworkID | E.g., BSSID |
|---|---|---|
| networkTechnology | NetworkTechnology | E.g., 802.11af, 802.22 |
| interferenceDirection | InterferenceDirection | Mutual, source or victim |
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |
| NetworkGeometryClass | NetworkGeometryClass | Network geometry class between a TVBD network and its neighbour TVBD network(s) |

TABLE 13

```
NetworkID::= ENUMERATED{
    BSSID,
    ...
}
NetworkTechnology ::= ENUMERATED{
    IEEE802.11af,
    IEEE802.22,
    ECMA392,
    ...
}
InterferenceDirection ::= ENUMERATED{mutual, source, victim}
NetworkGeometryClass ::= CHOICE{Class#1, Class#2, Class#3, Class#4}
```

Hereafter, a neighbor discovery operation by a CE in the discovery by the system for managing resources in a communication system in accordance with the embodiment of the present invention will be described in detail with reference to FIGS. 8 and 9.

Figure 8:
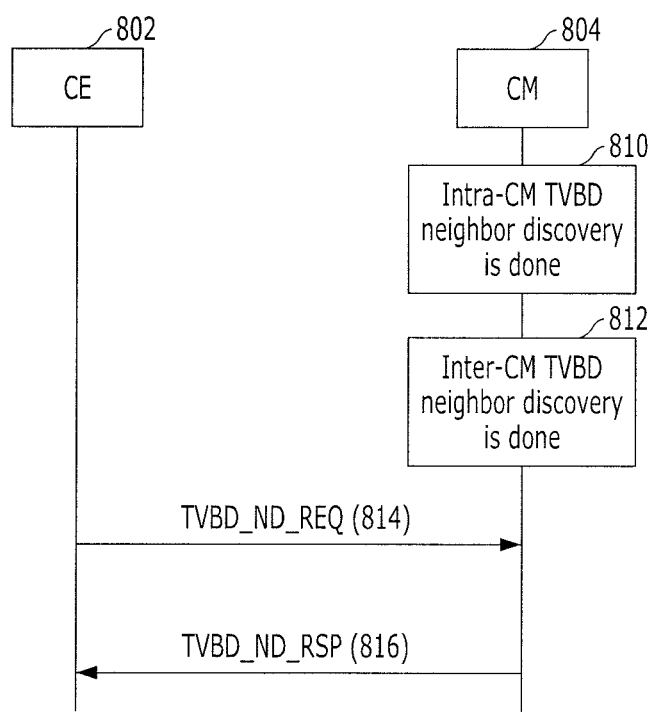
Figure 9:
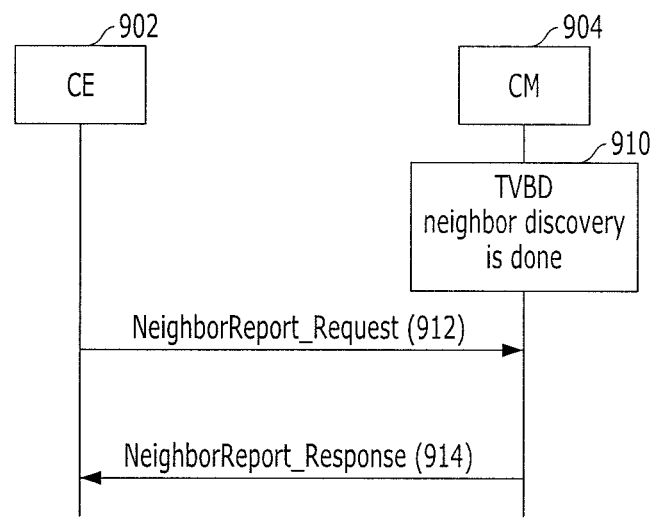

FIGS. 8 and 9 are diagrams schematically showing a neighbor discovery procedure of the system for managing resources in a communication system in accordance with the exemplary embodiment of the present invention. Here, FIGS. 8 and 9 are diagrams schematically showing a neighbor discovery procedure by a CE of the system for managing resources.

First, referring to FIG. 8, after the subscription for neighbor discovery for the coexistence and frequency sharing in the TVWS, in order for neighbor discovery, a CM 804 performs neighbor discovery among the TVBDs registered in the same CM, that is, the CM 804, that is, neighbor discovery for the intra-CM neighbor TVBDs (step 810). Then, the CM 804 completes neighbor discovery among the TVBDs registered in different CMs, that is, the CM 804 itself and neighbor CMs, that is, performs neighbor discovery for the inter-CM neighbor TVBDs (step 812).

With the neighbor discovery for the intra-CM neighbor TVBDs and the inter-CM neighbor TVBDs performed in this way, the CM 804 receives a TVBD neighbor discovery request (hereinafter, referred to as 'TVBD_ND_REQ') message for discovering the neighbor discovery information of the CM 804 in which a CE 802 is registered, that is, information on neighbor TVBDs of a corresponding TVBD registered in the CM 804 through the CE 802, namely, the intra-CM neighbor TVBDs and the inter-CM neighbor TVBDs of the CM 804, from the CE 802 (step 814). That is to say, in order to acquire the information of the neighbor TVBDs for the TVBD corresponding to the CE 802 itself, that is, information on the intra-CM neighbor TVBDs and the inter-CM neighbor TVBDs of the CM 804, and perform the neighbor discovery, the CE 802 transmits the TVBD_ND_REQ message to the CM 804 which has completed the neighbor discovery for the intra-CM neighbor TVBDs and the inter-CM neighbor TVBDs (step 814).

Here, the TVBD_ND_REQ message is a message which requests the coexistence information of the neighbor TVBDs, so as to discover the intra-CM neighbor TVBDs and the inter-CM neighbor TVBDs as described above. Also, the TVBD_ND_REQ message is used in the same manner in the centralized topology, the distributed topology and the autonomous mode of the system for managing resources. Further, the TVBD_ND_REQ message is used in the case where the CE 802 requests the neighbor discovery information for the intra-CM neighbor TVBDs and the inter-CM neighbor TVBDs of the corresponding TVBD, to the CM 804. The contents of the TVBD_ND_REQ message, that is, the header and payload of the TVBD_ND_REQ message may be presented as in Table 14.

TABLE 14

| Name | Data Type | Description |
|---|---|---|
| Header | | |
| SourceID | CE ID | Source identifier |
| DestinationID | CM ID | Destination identifier |
| Payload | | |
| None | | |

In addition, the CE 802 receives a TVBD neighbor discovery response (hereinafter, referred to as 'TVBD_ND_RSP') message which includes the neighbor discovery information for the intra-CM neighbor TVBDs and the inter-CM neighbor TVBDs, from the CM 804 as a response to the TVBD_ND_REQ message (step 816).

Here, the TVBD_ND_RSP message is a message which provides the coexistence information of the neighbor TVBDs to discover the intra-CM neighbor TVBDs and the inter-CM neighbor TVBDs as described above. Further, the TVBD_ND_RSP message is used in the same manner in the centralized topology, the distributed topology and the autonomous mode of the system for managing resources. Further, the TVBD_ND_RSP message is used in the case where the CM 804 provides the neighbor discovery information for the intra-CM neighbor TVBDs and the inter-CM neighbor TVBDs of the corresponding TVBD, to the CE 802. The contents of the TVBD_ND_RSP message, that is, the header and payload of the TVBD_ND_RSP message may be presented as in Table 15.

TABLE 15

| Name | Data Type | Description |
|---|---|---|
| Header | | |
| SourceID | CM ID | Source identifier |
| DestinationID | CE ID | Destination identifier |
| Payload | | |
| NeighborCMIDList | SEQUENCE OF STRING | Neighbor CM ID list |
| The message contents below are repeated for each neighbor CM | | |
| NeighborCMID | STRING | Neighbor CM ID |
| NeighborCEIDList | SEQUENCE OF STRING | Neighbor CE ID list |

Next, referring to FIG. 9, after the subscription for neighbor discovery for the coexistence and frequency sharing in the TVWS, in order for neighbor discovery, a CM 904 performs neighbor discovery for TVBDs, that is, neighbor discovery for inter-CM neighbor TVBDs and intra-CM neighbor TVBDs (step 910). Then, with the neighbor discovery for the inter-CM neighbor TVBDs and the intra-CM neighbor TVBDs performed, the CM 904 receives a neighbor report request (hereinafter, referred to as 'NeighborReport_Request') message for discovering the neighbor discovery information of the CM 904 in which a CE 802 is registered, that is, information on neighbor TVBDs of a corresponding TVBD registered in the CM 904 through the CE 902, namely, the intra-CM neighbor TVBDs and the inter-CM neighbor TVBDs of the CM 904, from the CE 902 (step 912). That is to say, in order to acquire the information of the inter-CM neighbor TVBDs and the intra-CM neighbor TVBDs and perform the neighbor discovery, the CE 902 transmits the NeighborReport_Request message to the CM 904 which has performed the neighbor discovery for the inter-CM neighbor TVBDs and the intra-CM neighbor TVBDs (step 912).

Here, the NeighborReport_Request message is a message which requests the coexistence information of the TVBDs, so as to discover the inter-CM neighbor TVBDs and the intra-CM neighbor TVBDs as described above. In other words, the NeighborReport_Request message is used in the case where the CE 902 requests the neighbor discovery information for the inter-CM neighbor TVBDs and the intra-CM neighbor TVBDs of the corresponding TVBD, to the CM 904. The contents of the NeighborReport_Request message, that is, the header and payload of the NeighborReport_Request message may be presented as in Table 16.

TABLE 16

| Information element | Data type | Description |
|---|---|---|
| Header | | |
| sourceIdentifier = CE_ID | CX_ID | Source identifier |
| destinationIdentifier = CM_ID | CX_ID | Destination identifier |
| ACKPolicy | BOOLEAN | Request to send an acknowledgement of reception |
| Payload | | |
| None | | |

In addition, the CE 902 receives a neighbor report response (hereinafter, referred to as 'NeighborReport_Response') message which includes the neighbor discovery information for the inter-CM neighbor TVBDs and the intra-CM neighbor TVBDs, from the CM 904 as a response to the NeighborReport_Request message (step 914).

Here, the NeighborReport_Response message is a message which provides the coexistence information of the neighbor TVBDs to discover the inter-CM neighbor TVBDs and the intra-CM neighbor TVBDs as described above. Namely, the NeighborReport_Response message is used in the case where the CM 904 provides the neighbor discovery information for the inter-CM neighbor TVBDs and the intra-CM neighbor TVBDs of the corresponding TVBD, to the CE 902. The contents of the NeighborReport_Response message, that is, the header and payload of the NeighborReport_Response message may be presented as in Table 17. The data type of the NeighborReport_Response message may be presented as in Table 18.

TABLE 17

| Information element | Data type | Description |
|---|---|---|
| Header | | |
| sourceIdentifier = CM_ID | CX_ID | Source identifier |
| destinationIdentifier = CE_ID | CX_ID | Destination identifier |
| ACKPolicy | BOOLEAN | Request to send an acknowledgement of reception |
| Payload | | |
| Note: Information elements below are repeated for each neighbor CM | | |
| neighborCMID | CX_ID | Neighbor CM ID |
| Note: Information elements below are repeated for each neighbor TVBD network or device. | | |
| networkID | NetworkID | E.g., BSSID |
| networkTechnology | NetworkTechnology | E.g., 802.11af, 802.22 |
| interferenceDirection | InterferenceDirection | Mutual, source or victim |

TABLE 17-continued

| | | |
|---|---|---|
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |
| listOfOperatingChannelNumber | ListOfOperatingChannelNumber OPTIONAL | List of operating channel number |
| listOfOperatingFrequencies | ListOfOperatingFrequencies OPTIONAL | List of operating frequencies |
| radioEnvironmentInformation | RadioEnvironmentInformation OPTIONAL | Radio environment information |
| NetworkGeometryClass | NetworkGeometryClass | Network geometry class between a TVBD network and its neighbour TVBD network(s) |

TABLE 18

```
NetworkID::= ENUMERATED{
    BSSID,
    ...
}
NetworkTechnology ::= ENUMERATED{
    IEEE802.11af,
    IEEE802.22,
    ECMA392,
    ...
}
InterferenceDirection ::= ENUMERATED{mutual, source, victim}
NetworkGeometryClass ::= CHOICE{Class#1, Class#2, Class#3, Class#4}
```

Hereafter, a neighbor discovery update operation in the discovery by the system for managing resources in a communication system in accordance with the embodiment of the present invention will be described in detail with reference to FIGS. 10 and 11.

Figure 10:
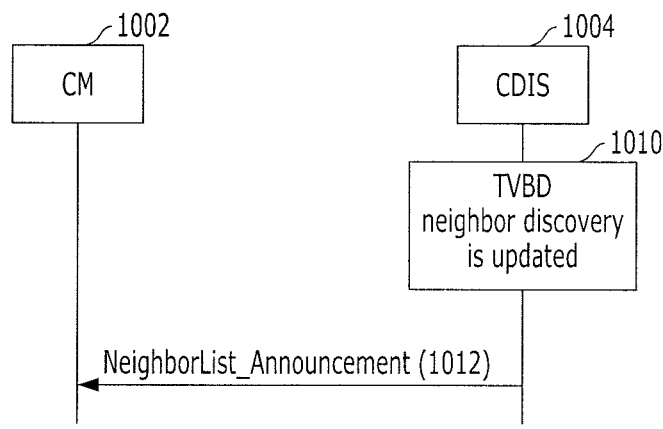
FIGS. 10 and 11 are diagrams schematically showing a neighbor discovery update procedure of the system for managing resources in a communication system in accordance with the exemplary embodiment of the present invention.
Figure 11:
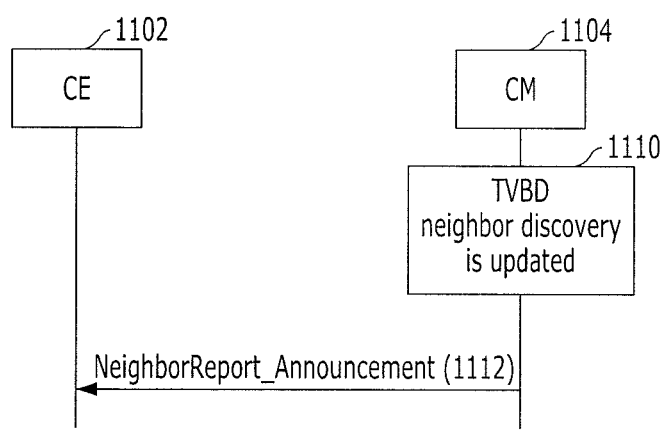

FIGS. 10 and 11 are diagrams schematically showing a neighbor discovery update procedure of the system for managing resources in a communication system in accordance with the exemplary embodiment of the present invention. Here, FIG. 10 is a diagram schematically showing a neighbor discovery update procedure by a CDIS of the system for managing resources, and FIG. 11 is a diagram schematically showing a neighbor discovery update procedure by a CM of the system for managing resources.

First, referring to FIG. 10, after the subscription for neighbor discovery for the coexistence and frequency sharing in the TVWS and after the neighbor discovery, in the case where a new TVBD is registered in a CM or a change occurs in an already registered TVBD as described above, a CDIS 1004 performs update of TVBD neighbor discovery for the newly registered TVBD or the change occurred in the already registered TVBD (step 1010). Then, with the update of the TVBD neighbor discovery for the newly registered TVBD or the change occurred in the already registered TVBD performed, the CDIS 1004 transmits a neighbor list announcement (hereinafter, referred to as 'NeighborList_Announcement') message to a CM 1002, to provide the updated TVBD neighbor discovery information of the corresponding CM to the corresponding CM (step 1012).

Here, the NeighborList_Announcement message is a message for announcing update of the TVBD neighbor discovery to the corresponding CM as the update of the TVBD neighbor discovery is performed when the new TVBD is registered in the corresponding CM or the change occurs in the already registered TVBD after the discovery for the inter-CM neighbor TVBDs and the intra-CM neighbor TVBDs is completed as described above. That is to say, the NeighborList_Announcement message is used in the case where the CDIS 1004 provides the updated TVBD neighbor discovery information to the CM 1002 which has completed the discovery for the inter-CM neighbor TVBDs and the intra-CM neighbor TVBDs. The contents of the NeighborList_Announcement message, that is, the header and payload of the NeighborList_Announcement message may be presented as in Table 19.

TABLE 19

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Request to send an acknowledgement of reception |

TABLE 19-continued

| Payload | | |
|---|---|---|
| Note: Information elements below are repeated for each neighbour CM. | | |
| neighbourCMID = CM_ID | CX_ID | Neighbour CM ID |
| Note: Information elements below are repeated for each neighbour TVBD network or device. | | |
| networkID | NetworkID | E.g., BSSID |
| networkTechnology | NetworkTechnology | E.g., 802.11af, 802.22 |
| interferenceDirection | InterferenceDirection | Mutual, source or victim |
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |
| NetworkGeometryClass | NetworkGeometryClass | Network geometry class between a TVBD network and its neighbour TVBD network(s) |

Next, referring to FIG. 11, after the subscription for neighbor discovery for the coexistence and frequency sharing in the TVWS and after the neighbor discovery, in the case where a new TVBD is registered in a CM 1104 or a change occurs in an already registered TVBD as described above, the CM 1104 performs update of TVBD neighbor discovery for the newly registered TVBD or the change occurred in the already registered TVBD (step 1110). Then, with the update of the TVBD neighbor discovery for the newly registered TVBD or the change occurred in the already registered TVBD performed, the CM 1104 transmits a neighbor report announcement (hereinafter, referred to as 'NeighborReport_Announcement') message to a CE 1102, to provide the updated TVBD neighbor discovery information of the corresponding TVBD registered through the CE 1102 to the corresponding CM, to the CE 1102 (step 1112).

Here, the NeighborReport_Announcement message is a message for announcing update of the TVBD neighbor discovery to the corresponding TVBD as the update of the TVBD neighbor discovery is performed when the new TVBD is registered in the corresponding CM or the change occurs in the already registered TVBD after the discovery for the inter-CM neighbor TVBDs and the intra-CM neighbor TVBDs is completed as described above. That is to say, the NeighborReport_Announcement message is used in the case where the CM 1104 provides the updated TVBD neighbor discovery information to the corresponding TVBDs for which the discovery for the inter-CM neighbor TVBDs and the intra-CM neighbor TVBDs has been completed, through the CE 1102. The contents of the NeighborReport_Announcement message, that is, the header and payload of the NeighborReport_Announcement message may be presented as in Table 20.

TABLE 20

| Information element | Data type | Description |
|---|---|---|
| Header | | |
| sourceIdentifier = CM_ID | CX_ID | Source identifier |
| destinationIdentifier = CE_ID | CX_ID | Destination identifier |
| ACKPolicy | BOOLEAN | Request to send an acknowledgement of reception |
| Payload | | |
| Note: Information elements below are repeated for each neighbor TVBD network or device. | | |
| networkID | NetworkID | E.g., BSSID |
| networkTechnology | NetworkTechnology | E.g., 802.11af, 802.22 |
| interferenceDirection | InterferenceDirection | Mutual, source or victim |
| interferenceLevelFromNeighbor | REAL | Estimated worst case interference level caused by the neighbor |
| interferenceLevelToNeighbor | REAL | Estimated worst case interference level caused by the TVBD network or device for which neighbors are reported |

TABLE 20-continued

| | | |
|---|---|---|
| listOfOperatingChannelNumber | ListOfOperatingChannelNumber OPTIONAL | List of operating channel number |
| listOfOperatingFrequencies | LisLOfOperatingFrequencies OPTIONAL | List of operating frequencies |
| radioEnvironmentInformation | RadioEnvironmentInformation OPTIONAL | Radio environment information |
| NetworkGeometryClass | NetworkGeometryClass | Network geometry class between a TVBD network and its neighbour TVBD network(s) |

As described above, in the system for managing resources in a communication system in accordance with the embodiment of the present invention, since discovery for neighboring frequency sharing devices, that is, neighbor TVBDs, is performed for coexistence and frequency sharing in a TVWS, it is possible to support coexistence and frequency sharing among a plurality of systems, that is, TVBDs, in the TVWS.

As is apparent from the above descriptions, in accordance with the embodiments of the present invention, frequency resources are managed such that a plurality of systems can use available frequency bands among frequency bands used in advance like a TV band through coexistence and frequency sharing in a communication system, thereby allowing efficient use of limited frequency resources and improving frequency resource utilization efficiency.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of systems which do not have a permission for a first frequency band, the system comprising:
   a coexistence manager configured to, when a frequency band available for the plurality of systems is searched from the first frequency band, manage the plurality of systems for coexistence and frequency sharing of the plurality of systems in the available frequency band;
   a coexistence enabler configured to transmit and receive information of the plurality of systems and information of the coexistence manager; and
   a coexistence discovery and information server configured to support control of the coexistence manager over the plurality of systems,
   wherein a plurality of coexistence managers are provided to respectively correspond to the plurality of systems, and
   wherein predetermined messages are transmitted and received among the coexistence discovery and information server, the plurality of coexistence managers and the coexistence enabler to discover neighbor systems among the plurality of systems,
   wherein the plurality of systems comprise a base station, an access point, a service access point, a terminal,
   wherein the system performs a neighbor discovery through a first scheme or a second scheme,
   wherein, in the first scheme, the plurality of coexistence managers perform intra neighbor discovery and the coexistence discovery and information server performs inter neighbor discovery,
   wherein, in the second scheme, the coexistence discovery and information server performs both the intra neighbor discovery and the inter neighbor discovery.

2. The system of claim 1, wherein the plurality of coexistence managers discover systems neighboring among pluralities of systems registered in them, as intra neighbor systems.

3. The system of claim 2, wherein the plurality of coexistence managers transmit request messages requesting coexistence information of the plurality of systems to the coexistence enabler, and receive response messages including the coexistence information of the plurality of systems, from the coexistence enabler as responses to the request messages, to discover the intra neighbor systems, and
   wherein each of the request messages and the response messages includes a header, a payload and a data type.

4. The system of claim 2, wherein the coexistence discovery and information server discovers systems neighboring among a plurality of systems registered in a first coexistence manager among the plurality of coexistence managers and a plurality of systems registered in a second coexistence manager among the plurality of coexistence managers, as inter neighbor systems.

5. The system of claim 4, wherein the coexistence discovery and information server transmits request messages requesting the coexistence information of the plurality of systems to the plurality of coexistence managers, and receives response messages including the coexistence information of the plurality of systems from the plurality of coexistence managers as responses to the request messages, to discover the inter neighbor systems, and
   wherein each of the request messages and the response messages includes a header, a payload and a data type.

6. The system of claim 4, wherein the plurality of coexistence managers transmit request messages requesting coexistence information of the inter neighbor systems to the coexistence discovery and information server, and receive response messages including the coexistence information of the inter neighbor systems from the coexistence discovery and information server as responses to the request messages, to discover the inter neighbor systems.

7. The system of claim 6, wherein the coexistence enabler transmits request messages requesting coexistence information of the inter neighbor systems and the intra neighbor systems to the plurality of coexistence managers, and receives response messages including the coexistence information of the inter neighbor systems and the intra neighbor systems from the plurality of coexistence managers as responses to the request messages, to discovery the inter neighbor systems and the intra neighbor systems, and
   wherein each of the request messages and the response messages includes a header, a payload and a data type.

8. The system of claim 7, wherein the plurality of coexistence managers update discovery of the inter neighbor systems and the intra neighbor systems when a change occurs in the pluralities of systems registered in them, and transmit announcement messages including coexistence information of the inter neighbor systems and the intra neighbor systems according to update, to the coexistence enabler, and
wherein each of the announcement messages includes a header, a payload and a data type.

9. The system of claim 6, wherein the coexistence discovery and information server updates discovery of the inter neighbor systems and the intra neighbor systems when a change occurs in the pluralities of systems registered in the plurality of coexistence managers, and transmits announcement messages including coexistence information of the inter neighbor systems and the intra neighbor systems according to update, to the plurality of coexistence managers, and
wherein each of the announcement messages includes a header, a payload and a data type.

10. The system of claim 6, wherein each of the request messages and the response messages includes a header, a payload and a data type.

11. The system of claim 1, wherein the coexistence discovery and information server discovers systems neighboring among a plurality of systems registered in a first coexistence manager among the plurality of coexistence managers and a plurality of systems registered in a second coexistence manager among the plurality of coexistence managers, as inter neighbor systems.

12. The system of claim 11, wherein the coexistence discovery and information server transmits request messages requesting the coexistence information of the plurality of systems to the plurality of coexistence managers, and receives response messages including the coexistence information of the plurality of systems from the plurality of coexistence managers as responses to the request messages, to discover the inter neighbor systems.

13. The system of claim 12, wherein the coexistence discovery and information server discovers systems neighboring among pluralities of systems registered in the same coexistence managers of the plurality of coexistence managers, as intra neighbor systems.

14. The system of claim 13, wherein the plurality of coexistence managers transmit request messages requesting coexistence information of the inter neighbor systems and the intra neighbor systems to the coexistence discovery and information server, and receive response messages including the coexistence information of the inter neighbor systems and the intra neighbor systems from the coexistence discovery and information server as responses to the request messages, to discover the inter neighbor systems and the intra neighbor systems.

15. The system of claim 14, wherein the coexistence enabler transmits request messages requesting coexistence information of the inter neighbor systems and the intra neighbor systems to the plurality of coexistence managers, and receives response messages including the coexistence information of the inter neighbor systems and the intra neighbor systems from the plurality of coexistence managers as responses to the request messages, to discovery the inter neighbor systems and the intra neighbor systems, and
wherein each of the request messages and the response messages includes a header, a payload and a data type.

16. The system of claim 15, wherein the coexistence discovery and information server updates discovery of the inter neighbor systems and the intra neighbor systems when a change occurs in the pluralities of systems registered in the plurality of coexistence managers, and transmits announcement messages including coexistence information of the inter neighbor systems and the intra neighbor systems according to update, to the plurality of coexistence managers, and
wherein each of the announcement messages includes a header, a payload and a data type.

17. The system of claim 14, wherein each of the request messages and the response messages includes a header, a payload and a data type.

18. The system of claim 1, wherein the plurality of coexistence managers transmit request messages to the coexistence discovery and information server and receive response messages from the coexistence discovery and information server as responses to the request messages, to make subscriptions to the coexistence discovery and information server, and
wherein each of the request messages and the response messages includes a header, a payload and a data type.

19. A method for managing resources of a first frequency band in a communication system including a plurality of systems which do not have a permission for the first frequency band, the method comprising:
subscribing a plurality of coexistence managers configured to, when a frequency band available for the plurality of systems is searched from the first frequency band, manage the plurality of systems for coexistence and frequency sharing of the plurality of systems in the available frequency band, to a coexistence discovery and information server configured to support control of the plurality of coexistence managers over the plurality of systems;
discovering neighbor systems among the plurality of systems; and
sharing coexistence information of discovered neighbor systems between the coexistence managers and the coexistence discovery and information server,
wherein the plurality of coexistence managers comprise a master coexistence manager and a plurality of slave coexistence managers,
wherein the sharing coexistence information of discovered neighbor systems comprises controlling the plurality of slave coexistence managers by the master coexistence manager or negotiating between one coexistence manager and neighboring coexistence managers of the one coexistence manager,
wherein the system performs a neighbor discovery through a first scheme or a second scheme,
wherein, in the first scheme, the plurality of coexistence managers perform intra neighbor discovery and the coexistence discovery and information server performs inter neighbor discovery,
wherein, in the second scheme, the coexistence discovery and information server performs both the intra neighbor discovery and the inter neighbor discovery.

20. The method of claim 19, wherein the plurality of coexistence managers discover systems neighboring among pluralities of systems registered in them, as intra neighbor systems, and
wherein the coexistence discovery and information server discovers systems neighboring among a plurality of systems registered in a first coexistence manager among the plurality of coexistence managers and a plurality of systems registered in a second coexistence manager among the plurality of coexistence managers, as inter neighbor systems.

* * * * *